(12) United States Patent
Tormey et al.

(10) Patent No.: US 6,862,694 B1
(45) Date of Patent: Mar. 1, 2005

(54) SYSTEM AND METHOD FOR SETTING AND EXECUTING BREAKPOINTS

(75) Inventors: Dan Tormey, Richardson, TX (US); Joe Bolding, Allen, TX (US); Bjorn Helgaas, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 09/972,094

(22) Filed: Oct. 5, 2001

(51) Int. Cl.$^7$ ................................................ G06F 11/00
(52) U.S. Cl. .......................... 714/34; 714/35; 714/38; 717/129
(58) Field of Search .............................. 714/34, 35, 38; 717/129

(56) References Cited

U.S. PATENT DOCUMENTS

| | | | | |
|---|---|---|---|---|
| 5,249,278 A | * | 9/1993 | Krauskopf | 711/203 |
| 5,386,522 A | * | 1/1995 | Evans | 717/124 |
| 5,664,159 A | * | 9/1997 | Richter et al. | 703/23 |
| 5,812,850 A | * | 9/1998 | Wimble | 717/131 |
| 6,052,801 A | * | 4/2000 | Hammond et al. | 714/38 |
| 6,493,806 B1 | * | 12/2002 | Royer et al. | 711/156 |

* cited by examiner

Primary Examiner—Robert Beausoliel
Assistant Examiner—Michael Maskulinski

(57) ABSTRACT

A system and method for setting and executing breakpoints utilized for debugging program code. A user interface (UI) stores breakpoint addresses in a breakpoint table within a central processing unit (CPU). Multiple breakpoint addresses may be stored in the table as a range of addresses in a single entry. A flag indicates whether each stored address or address range is a physical or virtual address. When executing the program code on the CPU, an instruction core requests from an instruction cache, an instruction associated with a particular address. The cache first determines from the breakpoint table within the CPU whether there is a breakpoint associated with the particular address. If so, the cache returns control to the UI. Otherwise, the cache goes out to a coherency controller to fetch the instruction from memory.

18 Claims, 8 Drawing Sheets

SYSTEM AND METHOD FOR SETTING AND EXECUTING BREAKPOINTS

CROSS-REFERENCE TO RELATED APPLICATION(S)

This application discloses subject matter related to the subject matter disclosed in commonly owned, co-pending U.S. patent application Ser. No. 09/843,265, entitled "Synchronous Breakpoint System And Method", filed Aug. 25, 2001 in the names of: Joe Bolding, Daniel Tormey, and Gerald Everett.

BACKGROUND OF THE INVENTION

1. Technical Field of the Invention

The present invention generally relates to software debugging tools. More particularly, and not by way of any limitation, the present invention is directed to a system and method for setting and executing breakpoints and ranges of breakpoints.

2. Description of Related Art

In spite of the diversity among software program debuggers, they all share a common operational model. In order to fix a bug, the developer executes the program, and then uses a debugger to examine its behavior. Normally, he sets a breakpoint at an address location that is of some significance to the code, the machine on which it is being executed, or both, and the program is launched. When the breakpoint is reached during the runtime, control is returned to the user so that he can single-step forward, trying to delineate what happened in the execution. The user needs to activate the debugger, then run the debugged program and reproduce the problematic behavior.

Architecting testable software for high performance computing platforms has become a daunting task. In today's multiprocessor (MP) systems having a large number of processors in myriad architectural arrangements, the task is even more challenging. There exist numerous variations on the basic theme of multiprocessing. In general, these variations relate to how independently the processors operate and how the workload among these processors is distributed. In loosely-coupled multiprocessing architectures, the processors perform related tasks but they do so as if they were standalone processors. Each processor is typically provided with its own private memory and may have its own mass storage and input/output (I/O). Further, each loosely-coupled processor runs its own copy of an operating system (OS), and communicates with the other processor or processors through a message-passing scheme, much like devices communicating over a local area network.

In tightly-coupled multiprocessing architectures, on the other hand, operation of the processors is more closely integrated. They typically share main memory, and may even have a shared cache. The processors need not be identical to one another, and may or may not perform similar tasks. However, they typically share other system resources such as mass storage and I/O. Additionally, instead of a separate copy of the OS for each processor, they run a single copy, with the OS handling the coordination of tasks between the processors.

Hardware architectures for tightly-coupled MP platforms can be further divided into two broad categories. In symmetrical MP (SMP) systems, system resources such as memory, disk storage and I/O are shared by all the microprocessors in the system. The workload is distributed evenly to available processors so that one does not sit idle while another is heavily loaded with a specific task. Further, the SMP architecture is highly scalable, i.e., the performance of SMP systems increases, at least theoretically, as more processor units are added. In asymmetrical MP systems, tasks and resources are managed by different processor units. For example, one processor unit may handle I/O and another may handle network OS (NOS)-related tasks. Thus, it should be apparent that an asymmetrical MP system may not balance the workload.

As briefly alluded to hereinabove, designing software intended for reliable cross-platform execution on the numerous MP systems available nowadays has become an arduous undertaking. Further, with ever-shrinking design/debug cycle times, software developers are continuously looking for ways to streamline the debug operations necessary to architect well-tested code, be it application software, OS software, or firmware.

In addition, it should be appreciated that oftentimes the hardware development of a particular platform may not have advanced far enough to allow debug testing of the software code targeted for that platform. Typically, an architectural simulator is utilized in such instances. The simulator, which is operable to simulate a target hardware platform, can "execute" a particular piece of software intended for the target hardware as if it were run on the actual machine itself, and is provided with a debugger for debugging the software using the conventional breakpoint methodology as set forth in the foregoing.

The conventional process for setting and executing breakpoints for code debugging purposes, however, is beset with several limitations. First, although breakpoint ranges of limited form may be set in some circumstances, in general, a breakpoint must be set for every address where the user wishes the program to stop. In complex systems, this may equate to thousands or even millions of breakpoints. Second, a breakpoint cannot be set at a virtual address until a virtual-to-physical mapping has been established. Third, a breakpoint cannot be set at a physical address until the physical address has backing (i.e., an actual physical memory and the registers and routing circuitry necessary to get to the memory from the processor). Additionally, in order to determine during execution whether a breakpoint has been set at a particular address, the conventional breakpoint process requires that the content of the memory be retrieved from that address and delivered to the CPU before it can be determined whether a breakpoint is associated with the address. It can be appreciated that such a process is cumbersome, inefficient, and time-consuming.

SUMMARY OF THE INVENTION

In one aspect, the present invention is directed to a system for setting breakpoints which are utilized for debugging software code. The system includes a breakpoint table within a central processing unit (CPU) in which addresses having associated breakpoints are stored, and a user interface that receives addresses having associated breakpoints from a user and sends the addresses to the breakpoint table for storage. The breakpoint table may also store an indication of whether each stored breakpoint address is a physical address or a virtual address. Additionally, the breakpoint table may store a range of breakpoint addresses as a single entry in the table, and may store an indication of whether each stored range of breakpoint addresses is a range of physical addresses or a range of virtual addresses.

In another aspect, the present invention is directed to a method of setting breakpoints which are utilized for debugging software code. The method includes the steps of sending addresses having associated breakpoints from a user interface to a breakpoint table within a CPU, and storing the addresses having associated breakpoints in the breakpoint table. The addresses may be stored as a range of addresses, and an indication may be stored for each address or range of addresses indicating whether the address or range of addresses is a physical address or a virtual address.

Thus, in the present invention, a list of individual breakpoints can be set up, breakpoint ranges can be set up, breakpoints can be set at virtual addresses before virtual-to-physical mapping has been established, and breakpoints can be set at physical addresses that do not yet have backing.

In yet another aspect, the present invention is directed to a method of debugging software code running on a CPU utilizing breakpoints at particular instruction addresses to halt the CPU and return control to a user utilizing a user interface. The method includes the steps of executing the software code in an instruction core; sending a request from the core to an instruction cache within the CPU requesting an instruction when a particular address in the code is reached; and sending the particular address from the cache to a breakpoint table within the CPU which stores addresses that are associated with breakpoints. The method also includes determining by the breakpoint table whether the particular address matches any of the addresses stored in the table, and upon determining that the particular address matches an address stored in the table, returning an indication to the cache that the particular address is associated with a. breakpoint. The cache then returns control to the user interface.

If the particular address does not match any of the addresses stored in the table, the method includes the additional steps of sending a request from the instruction cache to a coherency controller to fetch the instruction associated with the particular address from a memory device. The coherency controller maps the particular address to a memory location, and retrieves the instruction associated with the particular address from the mapped memory location. The retrieved instruction is then sent through the coherency controller and the cache to the instruction core where the retrieved instruction is executed.

Thus, in the present invention, the instruction cache goes out to the coherency controller and to the memory device to fetch the instruction only if it is first determined within the CPU that there is no breakpoint associated with the particular address.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
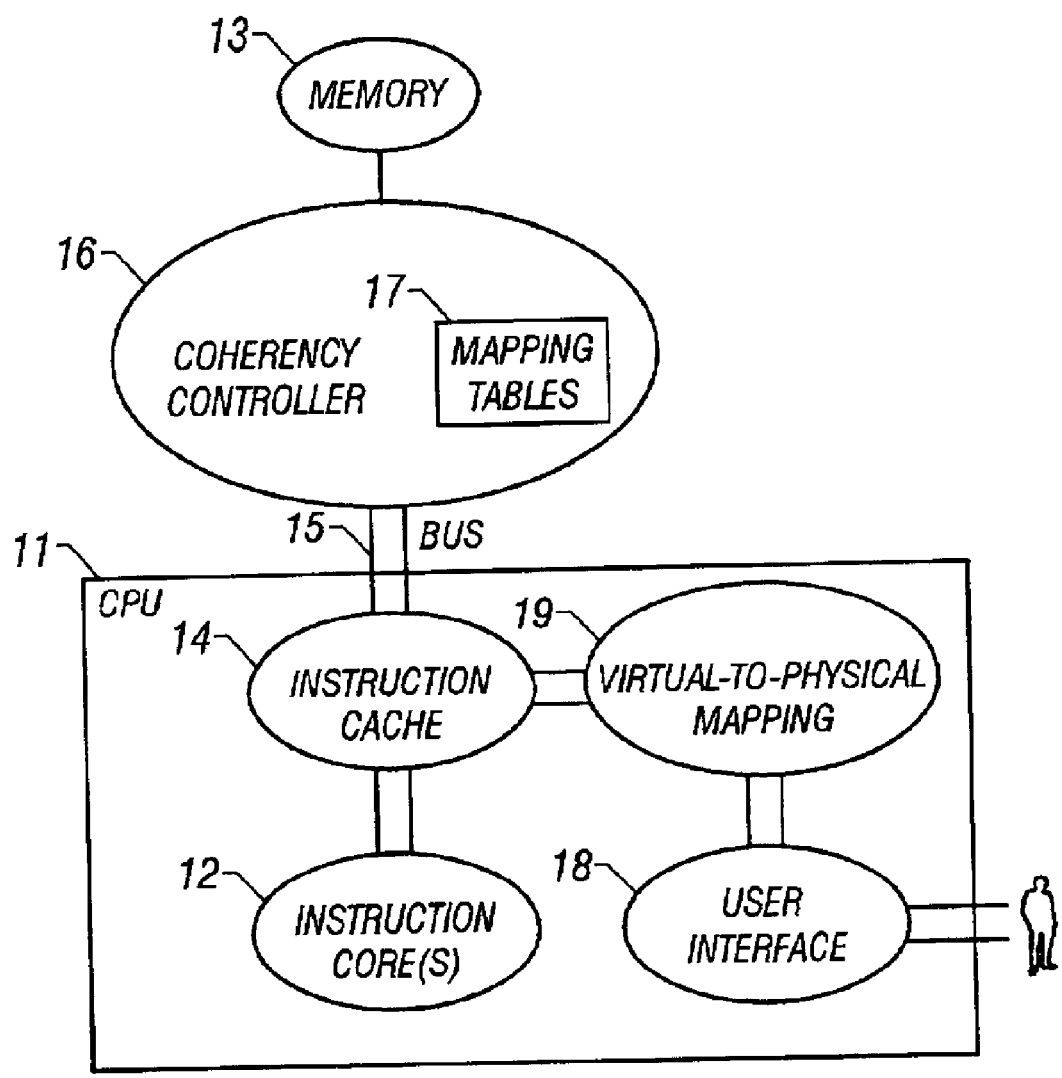
FIG. 1 (Prior Art) is a simplified block diagram of the components of a processing machine suitable for performing the conventional method of breakpoint operations.

In the drawings, like or similar elements are designated with identical reference numerals throughout the several views thereof, and the various elements depicted are not necessarily drawn to scale. Referring now to FIG. 1, depicted therein is a simplified block diagram of the components of a processing machine suitable for performing the conventional method of breakpoint operations. Within a processor (CPU) 11, one or more Instruction Core(s) 12 execute instructions that the processor fetches from memory 13. The Instruction Core has a connection to an Instruction Cache 14. When the Instruction Core is running in physical mode, the Cache is a simple pass through function. When the Core is not running in physical mode, the Cache retrieves instructions and holds a copy thereof for later use. The Cache communicates through a bus 15 to a Coherency Controller (CC) 16. The CC is connected to the physical memory 13, and includes mapping tables 17 which map physical addresses received from the Cache to memory locations. A User Interface (UI) 18 is also present, either on, but preferably off, the CPU. The UI communicates with the Cache and other system components. A virtual-to-physical mapping table 19 in the CPU receives breakpoint information from the UI and converts virtual addresses to physical addresses which are passed to the Cache for storage in the memory 13.

Figure 2:
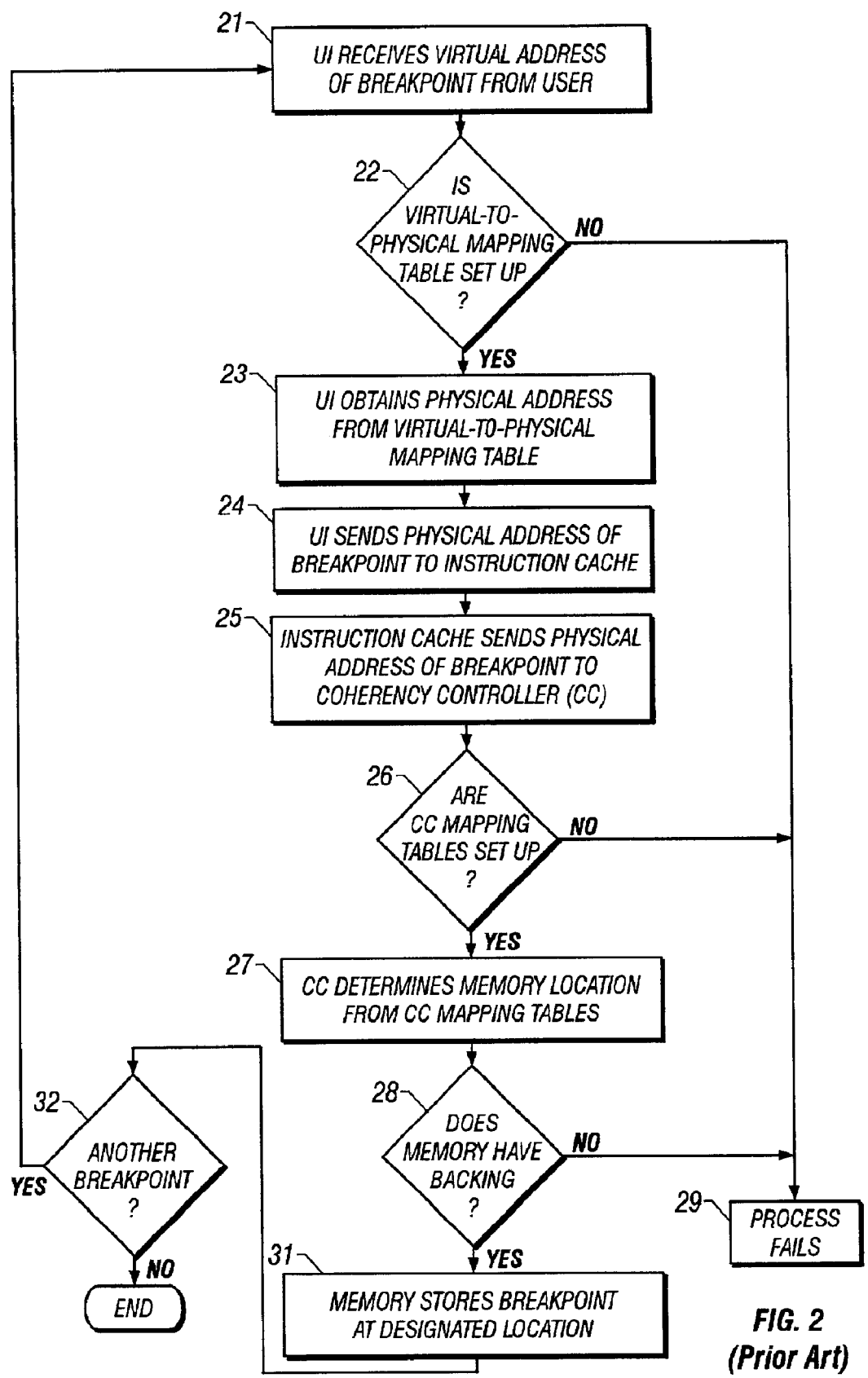
FIG. 2 (Prior Art) is a flow chart of the steps of the conventional method of setting up a plurality of breakpoints.

FIG. 2 is a flow chart of the steps of the conventional method of setting up a plurality of breakpoints. With reference to FIGS. 1 and 2, the method starts at step 21 where the User Interface (UI) 18 receives a virtual address of a breakpoint from the user. At step 22, it is determined whether the virtual-to-physical mapping table 19 is set up. If not, the method moves to step 29, and the process fails. However, if the virtual-to-physical mapping table is set up, the UI obtains the physical address of the breakpoint from the table at step 23. At step 24, the UI sends the physical address of the breakpoint to the Instruction Cache 14, and at step 25, the Cache sends the physical address to the Coherency Controller (CC) 16.

At step 26, it is determined whether the CC mapping tables are set up in the CC. If not, the method moves to step 29, and the process fails. However, if the CC mapping tables are set up, the CC determines the memory location of the breakpoint from the CC mapping tables at step 27, and requests that the memory 13 store the breakpoint information at that memory location. At step 28, it is determined whether the memory has backing. If not, the method moves to step 29, and the process fails. However, if the memory has backing, the method moves to step 31 where the memory stores the breakpoint information at the designated memory location.

When setting a breakpoint using the conventional method, the breakpoint is set for a particular address. So if the user desires to set a plurality of breakpoints, or a range of breakpoints, the user must set each individual address in the set or range (breakpoint address, breakpoint address+1, breakpoint address+2, etc.). Therefore, the method moves to step 32 where it is determined whether there are additional breakpoints that the user desires to set. If so, the method returns to step 21 and repeats the process for each additional breakpoint. When there are no additional breakpoints to be set at step 32, the method ends.

Figure 3A:
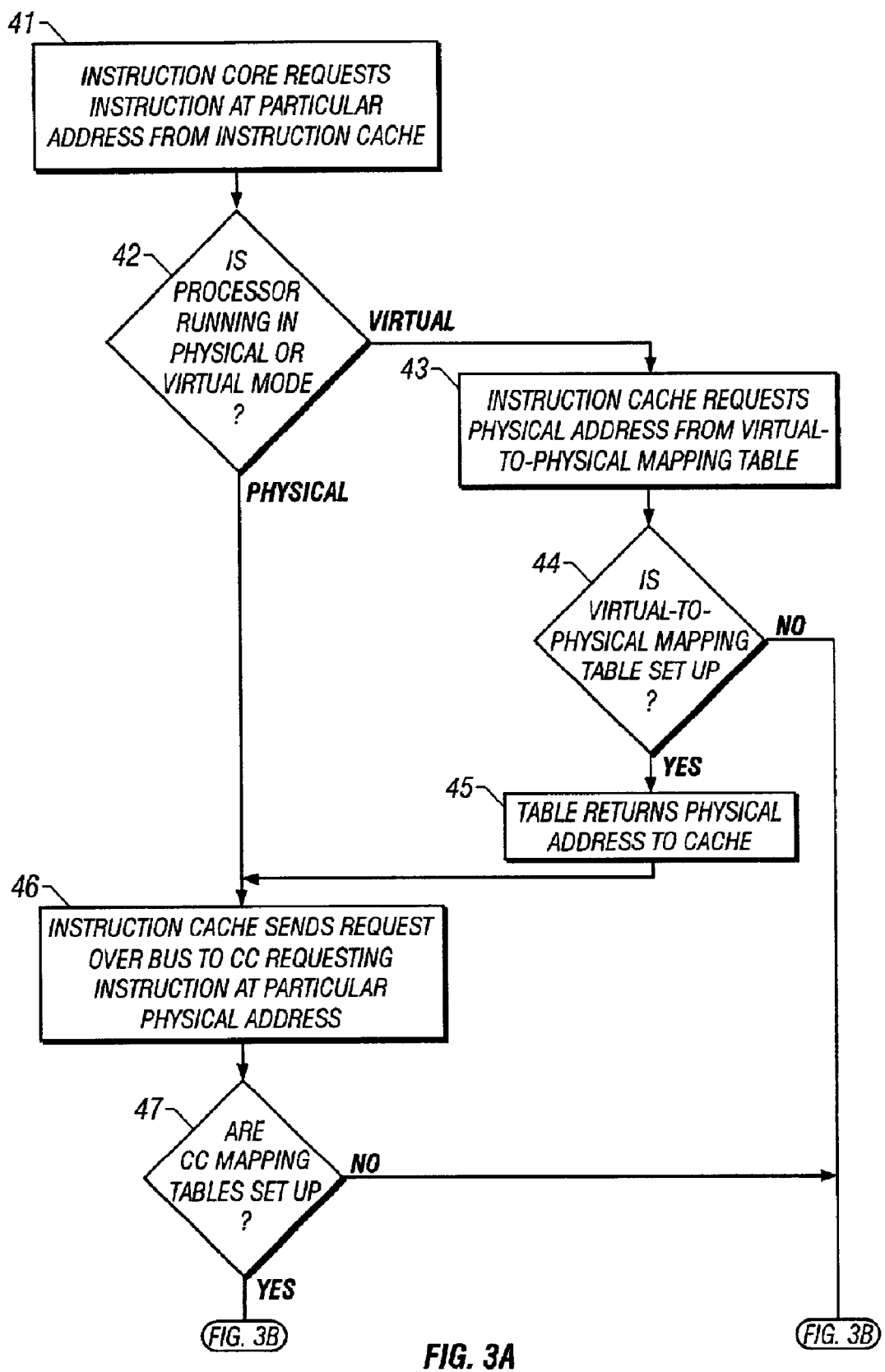
FIGS. 3A and 3B (Prior Art) are a flow chart of the steps of the conventional method of determining the existence of and executing a breakpoint.
Figure 3B:
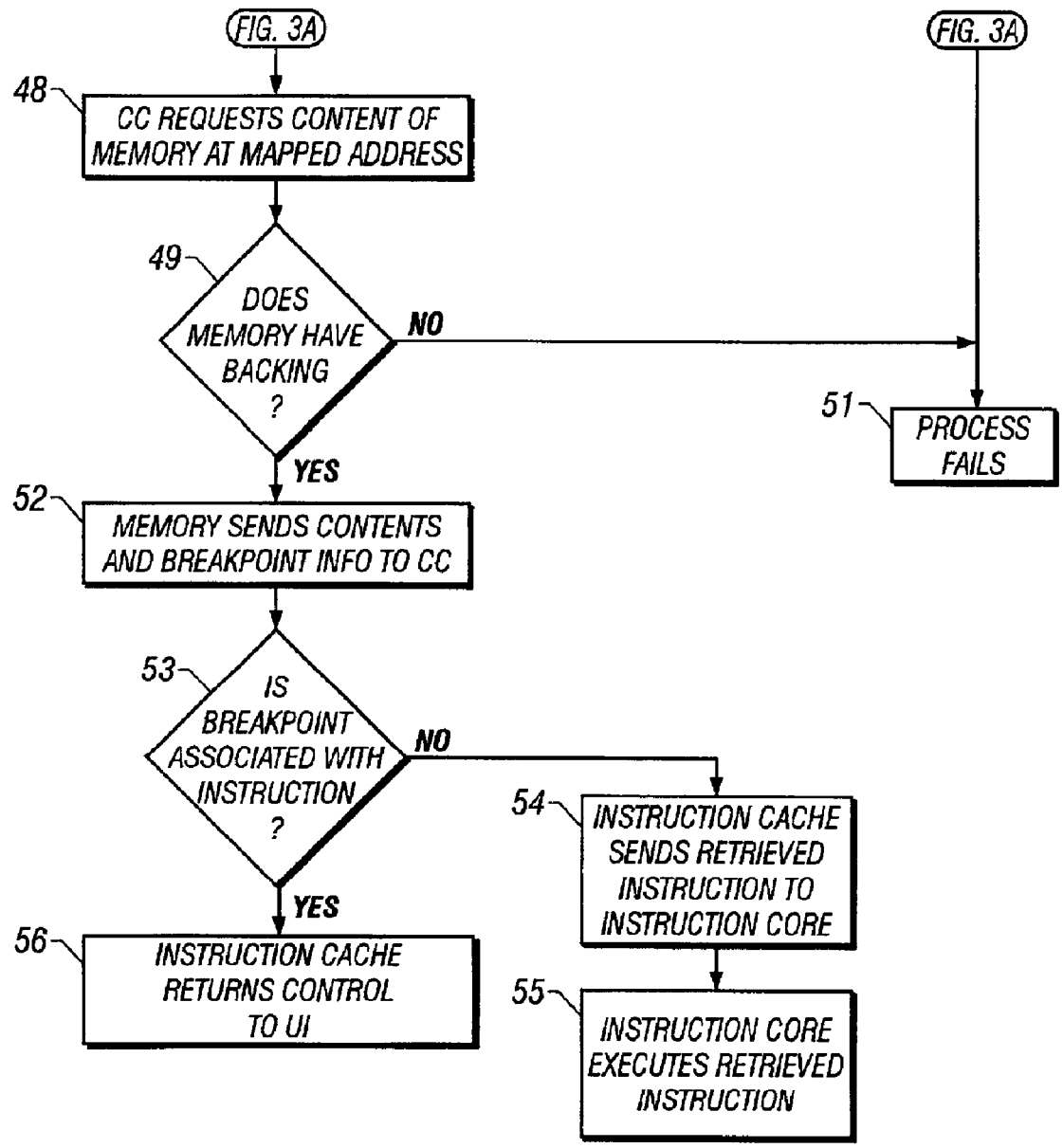

FIGS. 3A and 3B are a flow chart of the steps of the conventional method of determining the existence of and executing a breakpoint. With reference to FIGS. 1 and 3A, the method begins at step 41 where the program being debugged is being executed in the Instruction Core 12, and the Core requests an instruction at a particular address from the Instruction Cache 14. At step 42, it is determined whether the Core is running in the physical or virtual mode. If the Core is running in the physical mode, the method moves to step 46. However, if the Core is running in the virtual mode, the method moves to step 43 where the Cache requests the physical address of the instruction from the virtual-to-physical mapping table 19. At step 44, it is determined whether the virtual-to-physical mapping table is set up. If not, the method moves to step 51 (FIG. 3B), and the process fails. However, if the virtual-to-physical mapping table is set up, the method moves to step 45 where the table returns the physical address of the instruction to the Cache.

At step 46, the Instruction Cache 14 sends a request over the bus 15 to the CC 16 requesting the instruction at that particular physical address. At step 47, it is determined whether the CC mapping tables are set up in the CC. If not, the method moves to step 51 (FIG. 3B), and the process fails. However, if the CC mapping tables are set up, the method moves to FIG. 3B, step 48 where the CC determines the memory location of the instruction from the CC mapping tables, and requests the contents of the memory at the mapped address. At step 49, it is determined whether the memory has backing. If not, the method moves to step 51, and the process fails. However, if the memory has backing, the method moves to step 52 where the memory responds to the CC with the retrieved contents and any associated breakpoint information.

The retrieved contents and any associated breakpoint information are then returned to the Instruction Cache 14, and at 53, the Cache analyzes the information that was returned in order to determine whether there was a breakpoint associated with the retrieved instruction. If not, the method moves to step 54 where the Cache sends the retrieved instruction to the Instruction Core 12 which executes it at step 55. If there was a breakpoint associated with the retrieved instruction, the Cache returns control to the UI 18 at step 56.

With reference to the above figures, it can thus be seen that the conventional methods of setting breakpoints, and of retrieving and executing breakpoints are beset with numerous disadvantages, and there are numerous limitations that cause the methods to fail. It can be appreciated that the existing methods are cumbersome, inefficient, and time-consuming.

Figure 4:
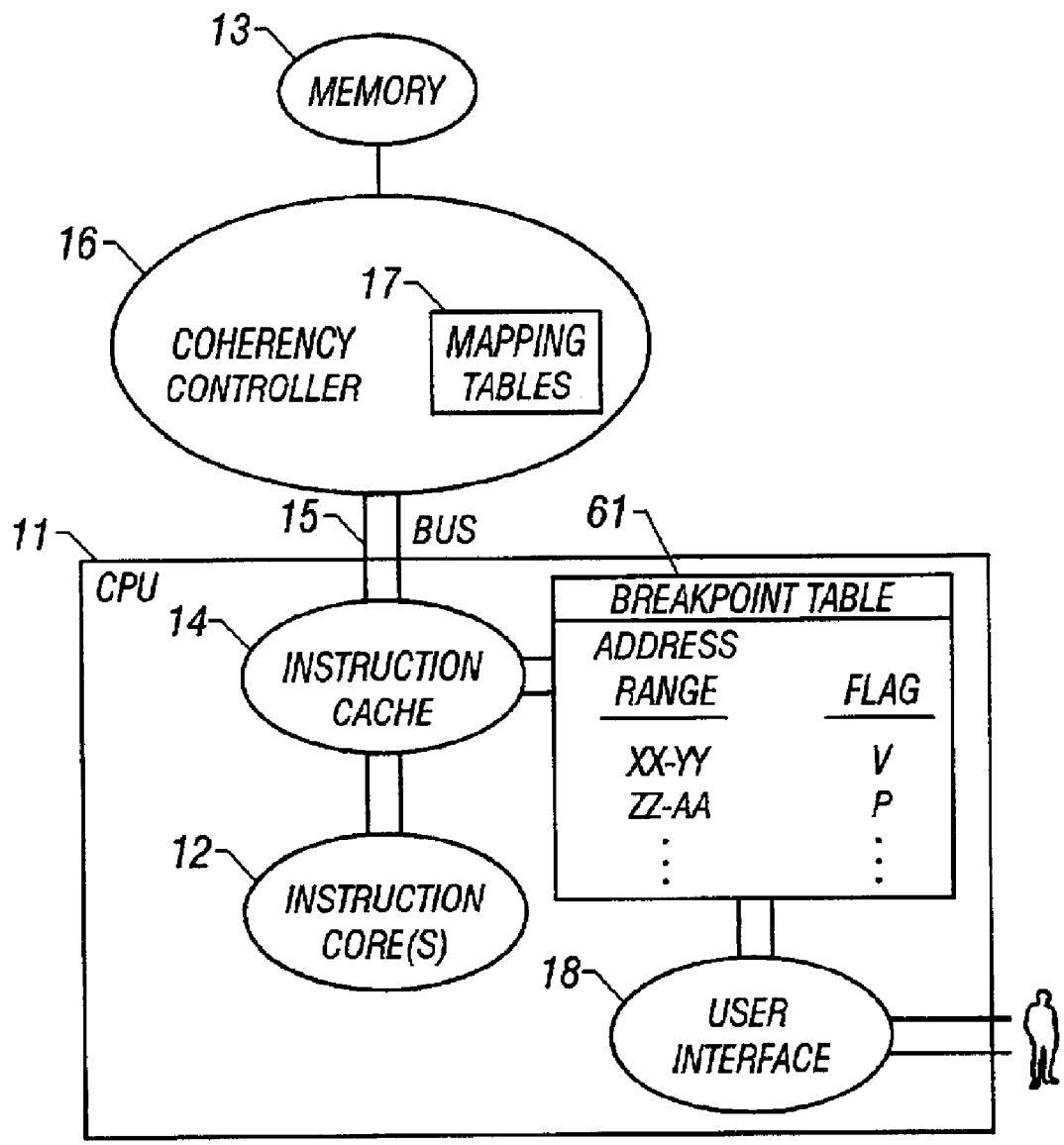
FIG. 4 is a simplified block diagram of the components of a processing machine modified in accordance with the teachings of the present invention to perform the inventive method of breakpoint operations.

FIG. 4 is a simplified block diagram of the components of a processing machine modified in accordance with the teachings of the present invention to perform the inventive method of breakpoint operations. The inventive method does not require a virtual-to-physical mapping table other than the capabilities inherent in the instruction core 12 and instruction cache 14, and thus, this component has been eliminated from the architecture. Instead, a Breakpoint Table 61 is implemented in the CPU 11. Within the Breakpoint Table, a list of breakpoints is created by the user through the UI 18. Breakpoints may be set in the table individually, or as a range of breakpoints in a single entry. In addition, each breakpoint or range of breakpoints can be flagged as being either at a physical address or at a virtual address. So multiple breakpoints can be set up using multiple modes and multiple ranges. Any suitable setup command can be used that enables the user to set up a list or a range of breakpoints at designated physical or virtual addresses. In the preferred embodiment, the following exemplary commands are utilized to implement the Breakpoint Table:

breakpoint pset address1 [address2]. This command sets a breakpoint at physical address1. If address2 is specified, a breakpoint range is set from physical address1 to physical address2.

breakpoint vset address1 [address2]. This command sets a breakpoint at virtual address1. If address2 is specified, a breakpoint range is set from virtual address1 to virtual address2.

breakpoint mode [{proc | phys | virt}[. This command sets modifies the operation of the breakpoint set address1 [address2] command (below) or displays the current breakpoint mode (processor, physical, or virtual).

breakpoint set address1 [address2]. This command sets a breakpoint at address1. If address2 is specified, a breakpoint range is set from address1 to address2. The type of breakpoint (physical or virtual) is determined by the setting of the breakpoint mode. If the breakpoint mode is physical, the breakpoint is set at a physical address. If the breakpoint mode is virtual, the breakpoint is set at a virtual address. If the breakpoint mode is proc, the type of breakpoint being set depends on the current mode of the processor. If the processor is in physical mode, the breakpoint is set at a physical address. If the processor is in virtual mode, the breakpoint is set at a virtual address.

Setting a breakpoint range gives the user the ability to instruct the program being debugged to stop whenever it hits any one address in the breakpoint range. So if the user does not know when the program is going to get to particular points, representing a list of functions, or if the user knows the program is going to get close to a particular breakpoint, but does not know exactly where it is going to be, the user can set a breakpoint range. For example, the range could be used for code that is going to be relocated, and the user does not know what the byte address offset is going to be when it is relocated. The user may only know some of the high order bits of the address. The breakpoint range may be set to stop the program anytime and every time the program hits an instruction within the range. Alternatively, the user may set the range so that the program stops the first time an instruction within the range is hit. That breakpoint is then temporarily disabled so that the program does not continue to step through every single instruction one at a time.

By storing a range of addresses in a single entry, the Breakpoint Table 61 can have fewer entries than if each breakpoint is listed individually. Since several million addresses may be designated in a range, time is also saved since the processor does not have to search through several million entries to determine whether there is a breakpoint associated with a particular instruction.

By keeping the breakpoint information strictly within the processor model (CPU) 11 itself, the method does not require that the CC 16 be initialized or that the memory 13 be set up. The virtual-to-physical mapping table is also not required because the breakpoint information can be placed at a virtual address even though the table is not set up. In a simulator, the table may maintain a list of logic branches on which it is desired to create a breakpoint. The list is given both a start address and an end address, and designates whether it is a physical or a virtual address.

Figure 5:
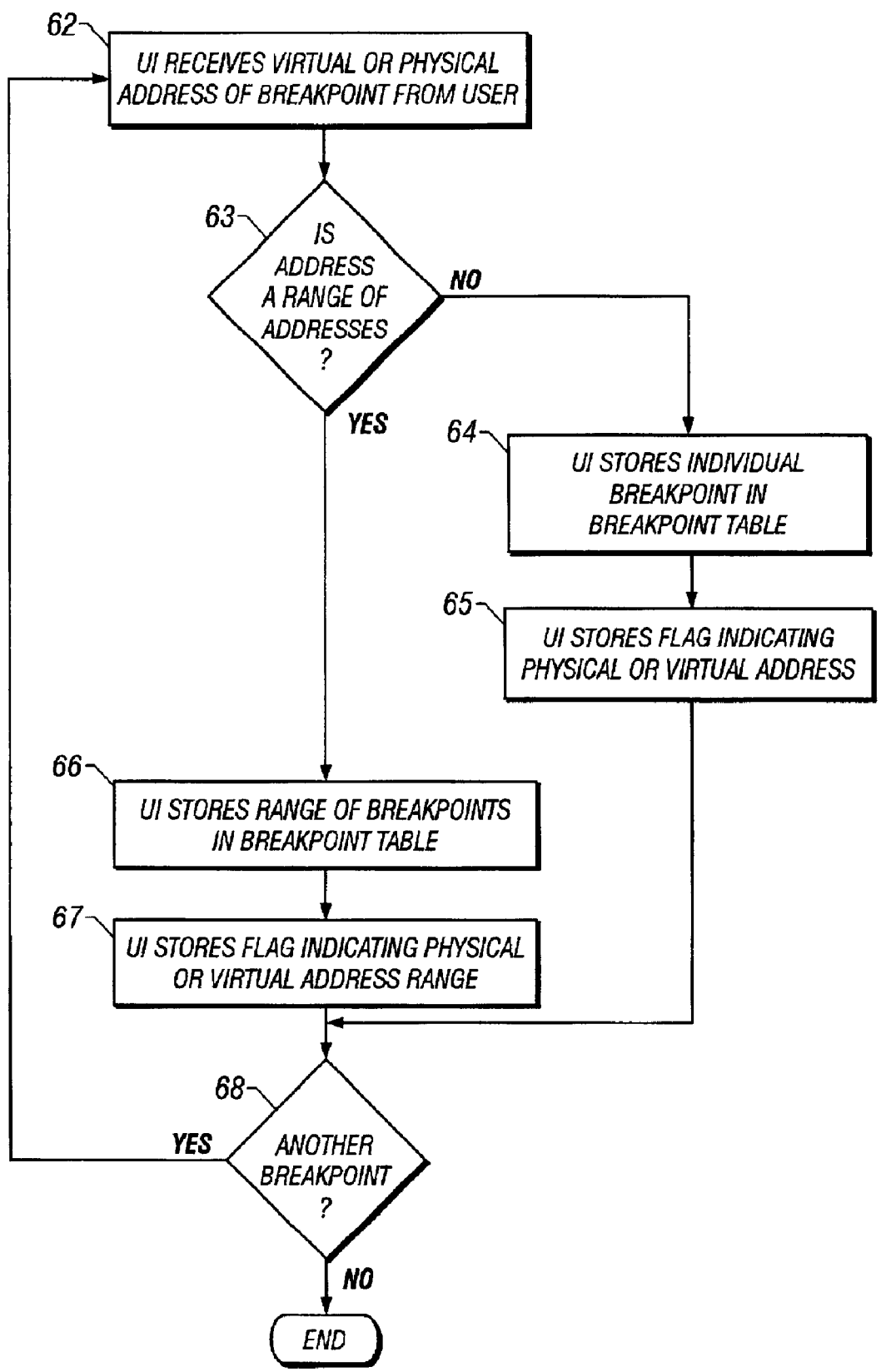
FIG. 5 is a flow chart of the steps of the method of the present invention for setting up a plurality of breakpoints.

FIG. 5 is a flow chart of the steps of the method of the present invention for setting up a plurality of breakpoints. With reference to FIGS. 4 and 5, the method begins at step 62 where the UI 18 receives a virtual or physical address for a breakpoint. At step 63, the UI determines at step 63 whether the breakpoint is specified as a range of breakpoints. If the breakpoint is not specified as a range, it is an individual breakpoint, and at step 64, the UI stores the individual breakpoint in the Breakpoint Table 61. At step 65, the UI sets a virtual/physical flag in the Breakpoint Table to indicate the type of breakpoint to be stored. However, if the breakpoint was specified as a range of breakpoints, the method moves from step 63 to step 66 where the UI stores the breakpoint range in the Breakpoint Table. At step 67, the UI sets a virtual/physical flag in the Breakpoint Table to indicate whether the range is a range of physical breakpoints or a range of virtual breakpoints.

The method then moves to step 68 where it is determined whether there are additional breakpoints, or additional breakpoint ranges, that the user desires to set. If so, the method returns to step 62 and repeats the process for each additional breakpoint and breakpoint range. When there are no additional breakpoints to be set at step 68, the method ends.

It should be noted that the request to set up a breakpoint does not go to the Instruction Cache 14, CC 16, or memory 13. In the present invention, the Cache, CC, and memory are not involved in setting up the breakpoints or If breakpoint ranges. Additionally, the virtual-to-physical mapping 19 in the CPU 11 is not required. The breakpoint may be set on a virtual address, so no virtual-to-physical mapping is required.

Figure 6A:
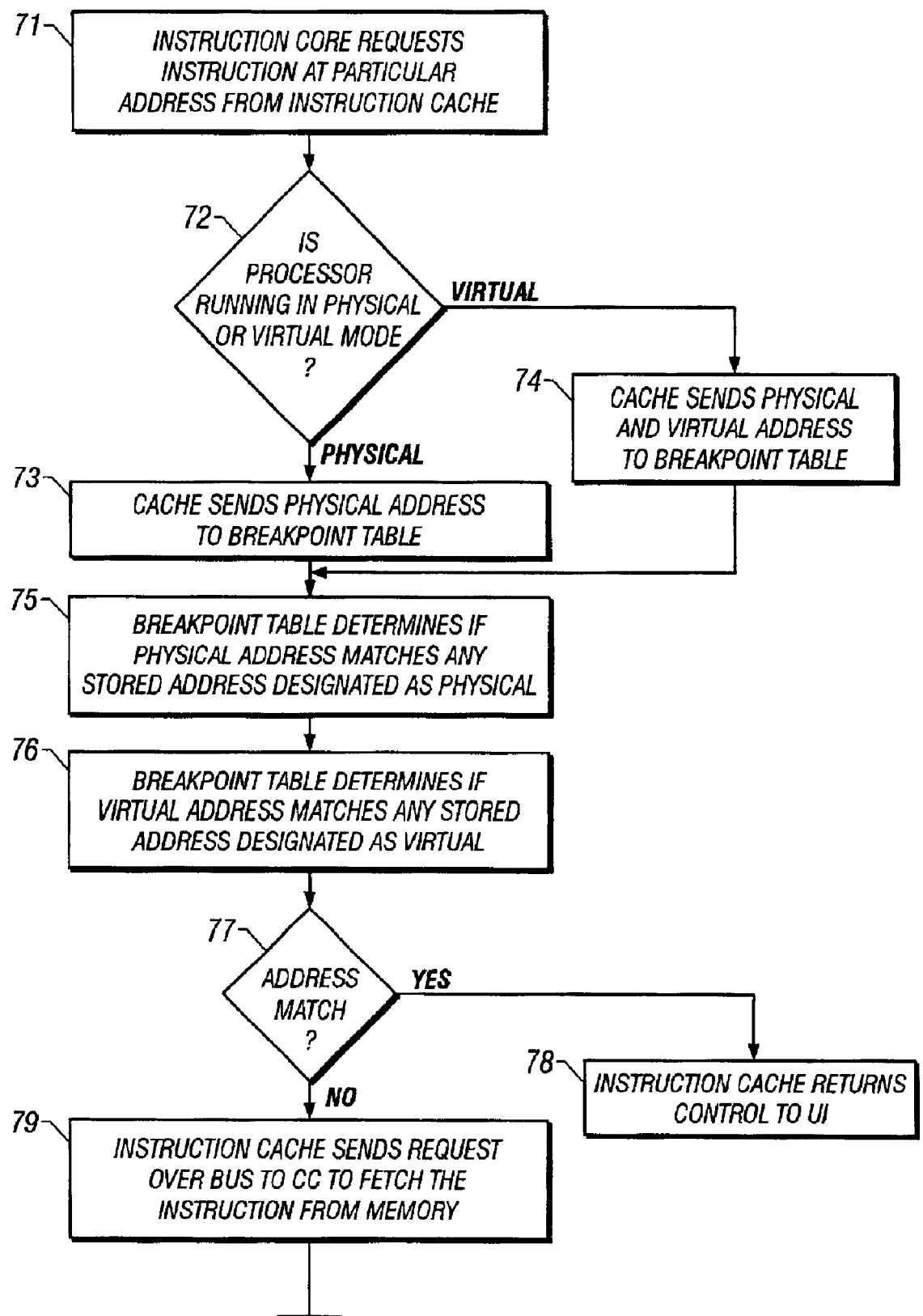
FIGS. 6A and 6B are a flow chart of the steps of the method of the present invention for determining the existence of and executing a breakpoint.
Figure 6B:
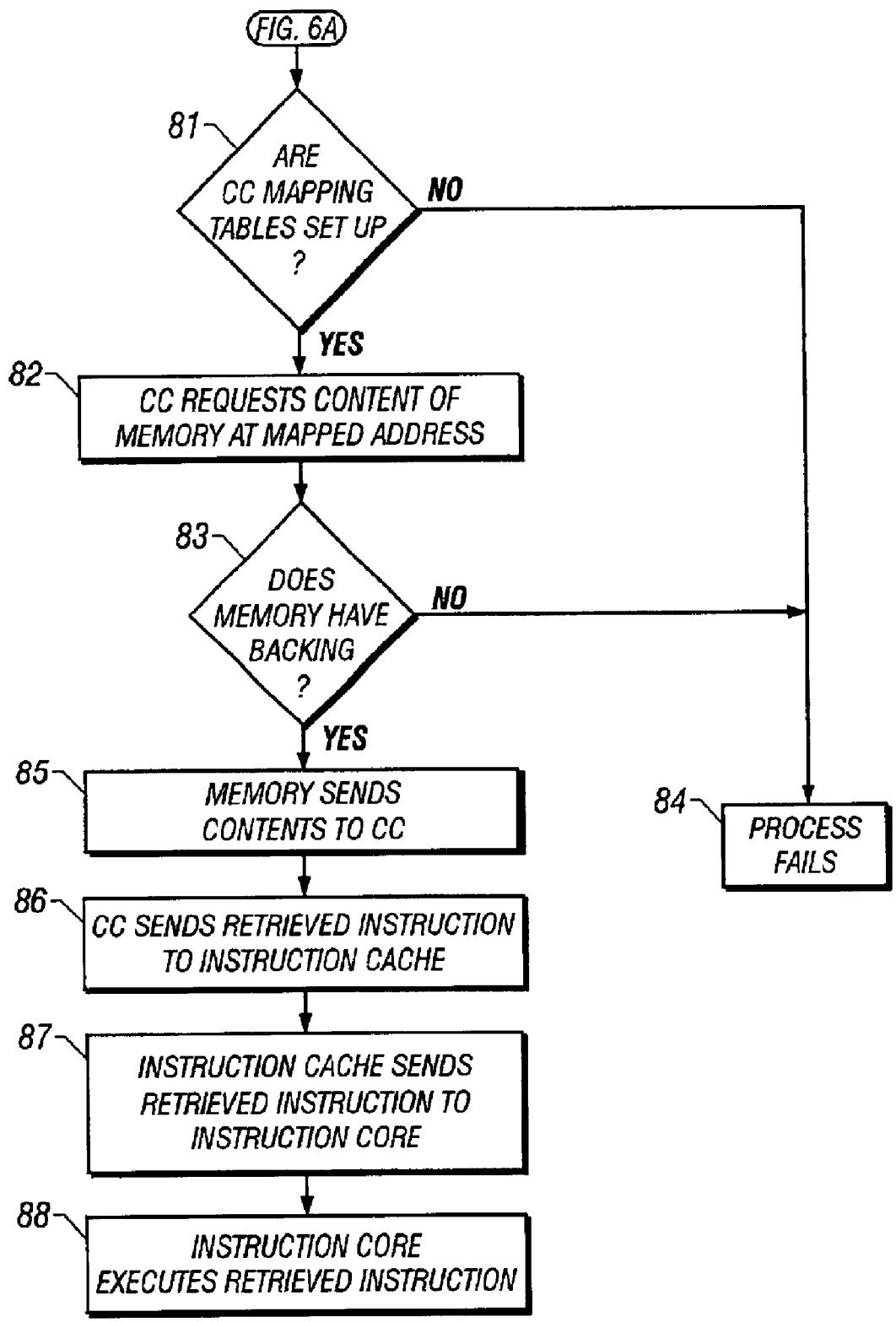

FIGS. 6A and 6B are a flow chart of the steps of the method of the present invention for determining the existence of and executing a breakpoint. With reference to FIGS. 4 and 6A, the method begins at step 71 where the program being debugged is being executed in the Instruction Core 12, and the Core requests an instruction at a particular address from the Instruction Cache 14. At step 72, it is determined whether the Core is running in the physical or virtual mode. If the Core is running in the physical mode, the method moves to step 73 where the Cache sends the physical address to the Breakpoint Table 61. If the Core is running in the virtual mode, the method moves to step 74 where the Cache performs a virtual-to-physical address translation and sends both the physical address and the virtual address to the Breakpoint Table. At step 75, the Breakpoint Table determines whether the physical address matches any stored address that is designated as a physical address. Likewise at step 76, the Breakpoint Table determines whether the virtual address matches any stored address that is designated as a virtual address. If there is a match at step 77, there is a breakpoint associated with the address, and the method moves to step 78 where the Cache returns control to the UI 18, and the processor is halted. Suitable debug operations, fault handlers, and the like may be launched at this point.

However, if there was not an address match, the method moves to step 79 where the Instruction Cache 14 sends a request over the bus 15 to the CC 16 to fetch the instruction from memory 13. The method then moves to FIG. 6B, step 81, where it is determined whether the CC mapping tables 17 are set up in the CC. If not, the method moves to step 84, and the process fails. However, if the CC mapping tables are set up, the method moves to step 82 where the CC determines the memory location of the instruction from the CC mapping tables, and requests the contents of the memory at the mapped address. At step 83, it is determined whether the memory has backing. If not, the method moves to step 84, and the process fails. However, if the memory has backing, the method moves to step 85 where the memory responds by sending the stored instruction to the CC. The retrieved instruction is then returned to the Instruction Cache 14 at step 86. At step 87, the Cache sends the retrieved instruction to the Instruction Core 12 which executes it at step 88.

It should be noted that the Instruction Cache 14 goes out to the CC 16, through the CC mapping tables 17, and to memory 13 to fetch the instruction only if it is first determined that there is no breakpoint associated with the address. During execution, the method determines from the Breakpoint Table 61 in the CPU 11 whether there is an associated breakpoint. This is much more efficient than the old method which had to go over the bus to the CC, through the CC mapping tables, and to memory and back just to determine whether there was an associated breakpoint.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, it should be clear to those skilled in the art that the present invention may be practiced with processing machines having a single core, or with machines having multiple cores such as SMP systems, asymmetrical MP systems, loosely-coupled MP architectures, shared- or dedicated-cache systems, and other high performance computing machines. The invention may also be practiced with synchronous breakpoint systems such as that described in co-pending and co-owned U.S. patent application Ser. No. 09/843,265, which is hereby incorporated by reference in its entirety herein.

Additionally, whereas the use of specific commands has been described in reference to the presently preferred exemplary embodiment of the present invention, such command implementations are merely illustrative. Furthermore, the program code to be debugged in accordance with the teachings of the present invention may be comprised of any type of software, firmware, or a combination thereof. Accordingly, all such modifications, extensions, variations, amendments, additions, deletions, combinations, and the like are deemed to be within the ambit of the present invention whose scope is defined solely by the claims set forth hereinbelow.

What is claimed is:

1. A system for setting breakpoints utilized for debugging program code, said system comprising:
    an instruction core within a central processing unit (CPU) having a program instruction that sets a breakpoint mode within the system to a physical mode or a virtual mode;
    a breakpoint table within the CPU in which both physical addresses and virtual addresses having associated breakpoints are stored; and
    a user interface that receives addresses having associated breakpoints from a user and sends the addresses to the breakpoint table for storage, said use interface sending a physical address if the breakpoint mode is set to the physical mode, and sending a virtual address if the breakpoint mode is set to the virtual mode.

2. The system of claim 1 wherein the program instruction alternatively sets the breakpoint mode within the system to a processor mode, and the instruction core selectively runs in either the physical mode or the virtual mode, wherein the user interface sends a physical address to the breakpoint table if the breakpoint mode is set to the processor mode and the instruction core is running in the physical mode, and the user interface sends a virtual address to the breakpoint table if the breakpoint mode is set to the processor mode and the instruction core is running in the virtual .mode.

3. The system of claim 1 wherein the user interface sends a range of breakpoint addresses to the breakpoint table, said table storing the range of breakpoint addresses as a single entry in the table.

4. The system of claim 3 wherein the breakpoint table includes a structure operable to indicate whether each stored range of breakpoint addresses is a range of physical addresses or a range of virtual addresses.

5. The system of claim 1 further comprising an instruction cache within the CPU that is programmed to access the breakpoint table to determine whether a breakpoint is associated with a particular address whenever the cache receives a request for an instruction at the particular address from an instruction core.

6. A method of setting breakpoints utilized for debugging program code, said method comprising:

sending addresses having associated breakpoints from a user interface to a breakpoint table within a central processing unit (CPU), the addresses including an indication of whether each address is a physical address or a virtual address; and storing the addresses having associated breakpoints in the breakpoint table.

7. The method of setting breakpoints of claim 6 wherein said sending includes sending a range of breakpoint addresses from the user interface to the breakpoint table, said table storing the range of breakpoint addresses as a single entry in the table.

8. The method of setting breakpoints of claim 2 wherein said sending includes sending an indication of whether each stored range of breakpoint addresses is a range of physical addresses or a range of virtual addresses.

9. The method of claim 6 further comprising programming an instruction cache within the CPU to access the breakpoint table to determine whether a breakpoint is associated with a particular address whenever the cache receives a request for an instruction at the particular address from an instruction core.

10. A method of debugging program code running on a central processing unit (CPU) utilizing breakpoints at particular instruction addresses to halt the CPU and return control to a user utilizing a user interface, said method comprising:

executing the program code in an instruction core;

sending a request from the core to an instruction cache within the CPU requesting an instruction when a particular address in the code is reached;

sending the particular address from the cache to a breakpoint table within the CPU, said breakpoint table storing addresses that are associated with breakpoints;

determining by the breakpoint table whether the particular address matches any of the addresses stored in the table, said determining including (i) further determining whether the particular address is a physical address type or a virtual address type; and (ii) comparing the determined address type with an indication stored in the breakpoint table indicating whether each stored breakpoint address is a physical address or a virtual address;

returning an indication from the table to the cache that the particular address is associated with a breakpoint, upon determining that the particular address matches an address stored in the table; and responsive to the indication that the particular address is associated with a breakpoint, returning control to the user interface.

11. The method of debugging program code of claim 10 further comprising:

returning an indication from the table to the cache that the particular address is not associated with a breakpoint, upon determining that the particular address does not match any of the addresses stored in the table;

sending a request from the cache to a coherency controller to fetch from a memory device, the instruction associated with the particular address;

mapping the particular address by the coherency controller to a memory location;

retrieving the instruction associated with the particular address from the mapped memory location;

sending the retrieved instruction through the coherency controller and the cache to the instruction core; and executing the retrieved instruction by the core.

12. The method of debugging program code of claim 10 wherein said sending the particular address from the cache to a breakpoint table includes:

determining whether the instruction core is running in a physical mode or a virtual mode;

sending a physical address to the breakpoint table if the core is running in physical mode; and sending both a physical address and a virtual address to the breakpoint table if the core is running in virtual mode.

13. The method of debugging program code of claim 10 wherein said determining by the breakpoint table whether the particular address matches any of the addresses stored in the table further includes determining whether the particular address matches any address within an address range that is stored in the table.

14. The method of debugging program code of claim 13 wherein the step of determining by the breakpoint table whether the particular address matches any of the addresses stored in the table includes:

comparing the determined address type with an indication stared in the breakpoint table indicating whether the stored range of breakpoint addresses is a range of physical addresses or a range of virtual addresses.

15. The method of debugging program code of claim 10 further comprising, before the step of executing the program code an instruction core, sending addresses having associated breakpoints from the user interface to the breakpoint table within the CPU; and storing the addresses having associated breakpoints in the breakpoint table.

16. The method of debugging program code of claim 15 wherein said sending addresses having associated breakpoints from a user interface to a breakpoint table includes sending an indication of whether each stored breakpoint address is a physical address or a virtual address.

17. The method of debugging program code of claim 15 wherein said sending addresses having associated breakpoints from a user interface to a breakpoint table includes sending a range of breakpoint addresses from the user interface to the breakpoint table, said table storing the range of breakpoint addresses as a single entry in the table.

18. The method of debugging program code of claim 17 wherein said sending addresses having associated breakpoints from a user interface to a breakpoint table includes sending an indication of whether each stored range of breakpoint addresses is a range of physical addresses or a range of virtual addresses.

* * * * *

UNITED STATES PATENT AND TRADEMARK OFFICE
CERTIFICATE OF CORRECTION

PATENT NO.       : 6,862,694 B1                                   Page 1 of 1
APPLICATION NO. : 09/972094
DATED            : March 1, 2005
INVENTOR(S)      : Dan Tormey et al.

It is certified that error appears in the above-identified patent and that said Letters Patent is hereby corrected as shown below:

IN THE CLAIMS

Claim 1, Column 8, line 49, delete "use" and insert therefor --user--

Claim 14, Column 10, line 34, delete "stared" and insert therefor --stored--

Signed and Sealed this

Fourteenth Day of August, 2007

JON W. DUDAS
*Director of the United States Patent and Trademark Office*